UNITED STATES PATENT OFFICE.

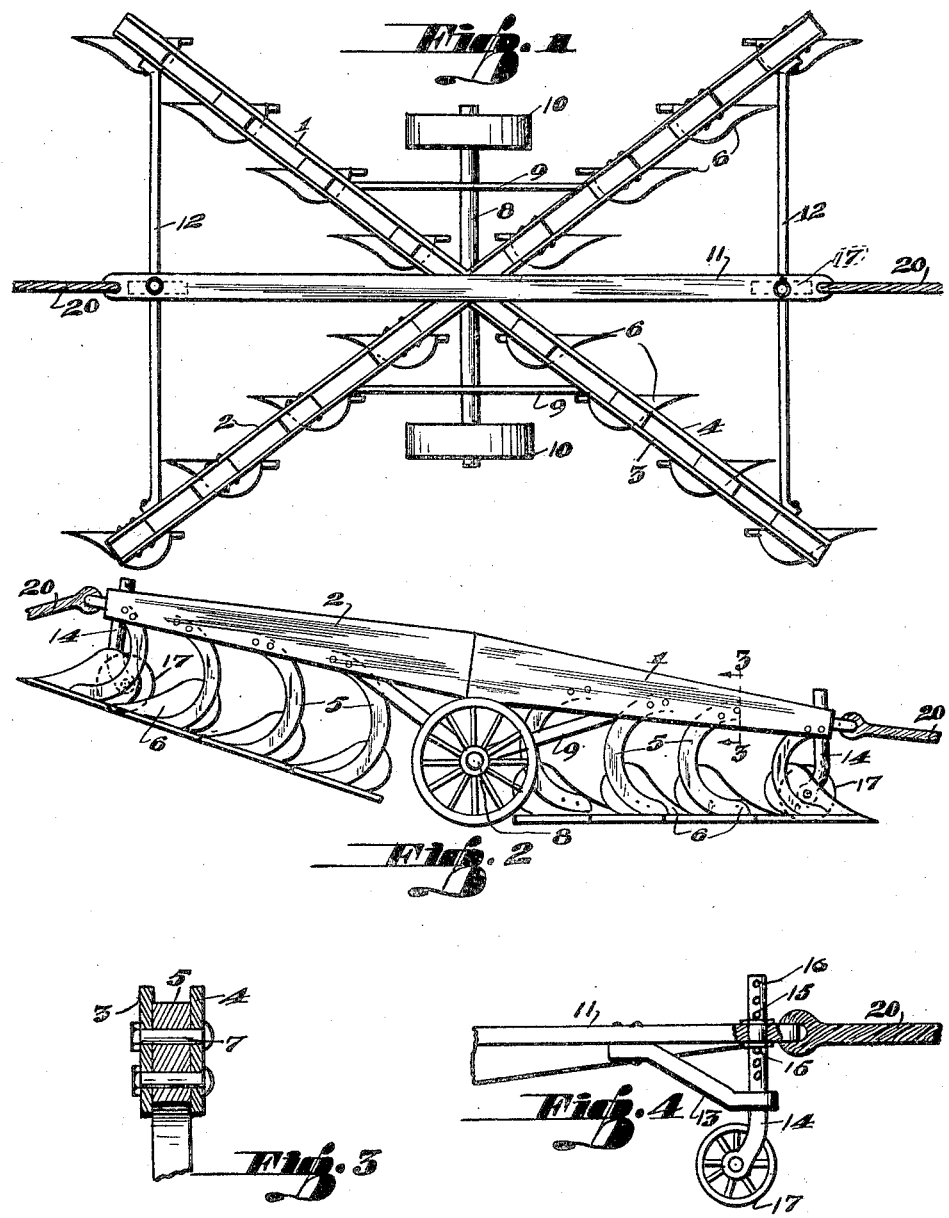

MICHAEL J. CORRIGAN, OF CALIPATRIA, CALIFORNIA.

CANTALIVER-PLOW.

1,384,992. Specification of Letters Patent. Patented July 19, 1921.

Application filed October 11, 1920. Serial No. 416,266.

*To all whom it may concern:*

Be it known that I, MICHAEL J. CORRIGAN, a citizen of the United States, residing at Calipatria, in the county of Imperial and State of California, have invented new and useful Improvements in Cantaliver - Plows, of which the following is a specification.

This invention relates to earth working implements adapted to be moved back and forth across a field and provided with earth engaging elements arranged to engage the earth during the respective movements in opposite directions of the implement.

The invention will be readily understood from the following description of the accompanying drawings, in which;

Figure 1 is a plan view of an implement constructed in accordance with the invention.

Fig. 2 is a side elevation of the implement.

Fig. 3 is a detail section on the line 3—3 of Fig. 2.

Fig. 4 is a detail side elevation of the draft mechanism for the implement.

A device constructed in accordance with the invention may be provided with various earth working implements so as to form various earth engaging machines, and in the present exemplification of the invention I have shown a ditching plow structure wherein the plow elements carried by the machine are adapted to plow a plurality of furrows with the earth from the furrows deposited in the spaces left by the plows between adjacent furrows.

The implement consists of cantaliver frames 1 and 2 crossed in a horizontal plane, as clearly shown in Fig. 1. Each of these frames comprise side bars 3 and 4 spaced apart by the shanks 5 of plow shoes 6. The side bars may be connected to the shanks 5 by means of the bolts 7.

An axle 8 extends beneath the intersection of frames 1 and 2, and said axle is journaled in bearing brackets 9. The ends of these bearing brackets are connected to the ends of frames 1 and 2 at the opposite sides of axle 8. Wheels 10 are journaled upon axle 8.

The construction as thus set forth provides a support for frames 1 and 2 from axle 8 and also permits of tilting of frames 1 and 2 with relation to the axle so that the ends of said frames at one side of the axle may be moved toward the ground, while the ends of said frames at the other side of the axle are elevated from the ground.

A draw bar 11 is arranged at right angles to axle 8 and is connected to frames 1 and 2 at their point of intersection. This draw bar extends in opposite directions from the axle and may be provided with cross braces 12 extending to the ends of the frames at the respective sides of the axle. Bearing brackets 13 are arranged below the respective ends of the draw bar, and standards 14 are pivoted in these bearing brackets and in the ends of the draw bar. These standards may be vertically adjusted with relation to the draw bar by means of pins 15 adapted to be received through any one of a series of apertures 16 along the length of the standards. When the standards have been positioned with relation to the draw bar, the pins 15 are inserted through such ones of the apertures 16 as will cause the pins to abut against the upper and lower surfaces of the draw bar and thereby prevent vertical movement of the standards while permitting pivotal movement of the same with relation to the draw bar and bearing brackets 13. Auxiliary wheels 17 for the implement are journaled in the standards 14, the auxiliary wheels at the respective ends of the implement being so arranged as to permit tilting of the implement upon the axle 8, and being also adapted to limit said tilting movement.

The plow shoes carried by frames 1 and 2 at the respective sides of axle 8, face in opposite directions and are so arranged that when the implement is moved forwardly by a cable 20 attached to one end of draw bar 11, the plow shoes at the side of axle 8 and at which the draft is provided, are so positioned as to operatively engage the earth. When the draft in the implement is provided from the other end of the draw bar, the frame of the implement will be tilted upon axle 8 to move the plow shoes at the other side of axle 8 toward the ground, and these plow shoes will then operatively engage the earth.

Various changes may be made without departing from the spirit of the invention as claimed.

What is claimed is.

An earth working implement comprising a wheel support, a frame comprising cross members tiltably mounted upon said support at the intersection of said members and having the latter extending in opposite directions from the axis of said support, and earth working elements carried by said frame and arranged to engage the earth when the implement is moving in opposite directions.

In testimony whereof I have signed my name to this specification.

MICHAEL J. CORRIGAN.